United States Patent
Ladkani et al.

(10) Patent No.: US 11,640,290 B2
(45) Date of Patent: May 2, 2023

(54) PUSHING A FIRMWARE UPDATE PATCH TO A COMPUTING DEVICE VIA AN OUT-OF-BAND PATH

(71) Applicant: Microsoft Technology Licensing, LLC, Redmond, WA (US)

(72) Inventors: Neeraj Ladkani, Bothell, WA (US); Daini Xie, Redmond, WA (US); Mallik Bulusu, Bellevue, WA (US); Muhammad Ashfaq Ahmed, Redmond, WA (US)

(73) Assignee: Microsoft Technology Licensing, LLC

( * ) Notice: Subject to any disclaimer, the term of this patent is extended or adjusted under 35 U.S.C. 154(b) by 242 days.

(21) Appl. No.: 17/081,931

(22) Filed: Oct. 27, 2020

(65) Prior Publication Data
US 2022/0129258 A1 Apr. 28, 2022

(51) Int. Cl.
*G06F 8/65* (2018.01)
*G06F 13/42* (2006.01)

(52) U.S. Cl.
CPC ............ *G06F 8/65* (2013.01); *G06F 13/4221* (2013.01); *G06F 13/4282* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 9,176,752 B1 * | 11/2015 | Marr | G06F 9/44505 |
| 2009/0168088 A1 * | 7/2009 | Rosenblatt | B65D 75/52 |
| | | | 358/1.12 |
| 2018/0018149 A1 * | 1/2018 | Cook | G06F 8/70 |
| 2018/0157494 A1 * | 6/2018 | Dunham | G06F 13/24 |
| 2020/0133652 A1 * | 4/2020 | Bhimanadhuni | G06F 9/4403 |
| 2021/0240489 A1 * | 8/2021 | Xie | G06F 9/544 |

OTHER PUBLICATIONS

"International Search Report and Written Opinion Issued in PCT Application No. PCT/US21/053053", dated Feb. 8, 2022, 12 Pages.

\* cited by examiner

*Primary Examiner* — Isaac Tuku Tecklu (57) ABSTRACT

A host computing device includes a host processor, host memory in electronic communication with the host processor, and an auxiliary service controller. The host computing device also includes a communication interface and a messaging interface between the host processor and the auxiliary service controller. A message handler is stored in the host memory. The message handler is executable by the host processor in response to detecting a messaging interface signal on the messaging interface. Execution of the message handler by the host processor causes a firmware update patch to be read from a shared memory region in the auxiliary service controller via the communication interface.

17 Claims, 6 Drawing Sheets

PUSHING A FIRMWARE UPDATE PATCH TO A COMPUTING DEVICE VIA AN OUT-OF-BAND PATH

CROSS-REFERENCE TO RELATED APPLICATIONS

N/A

BACKGROUND

The present disclosure is generally related to an environment in which firmware updates should be performed with respect to a plurality of computing devices. A datacenter is one example of an environment in which the techniques disclosed herein can be utilized.

A datacenter is a physical facility that can be used to house computing systems and associated components. A datacenter typically includes a large number of computing devices (e.g., servers), which may be stacked in racks that are placed in rows. A datacenter generally also includes redundant or backup components and infrastructure for power supply, data communication connections, environmental controls, and various security devices.

There are many challenges associated with operating a datacenter. One challenge is related to the firmware of the computing devices within the datacenter. Firmware is a specific class of computer software that provides the low-level control for the hardware of a computing device. Firmware is held in non-volatile memory devices such as read-only memory (ROM), erasable programmable ROM (EPROM), or electrically erasable programmable ROM (EEPROM). Firmware can be used to perform hardware initialization during the booting process of a computing device, and also to provide runtime services for operating systems and programs. Examples of computing device firmware include the Basic Input/Output System (BIOS) and the Unified Extensible Firmware Interface (UEFI). The UEFI is a successor to the BIOS, and it provides several technical advantages over a traditional BIOS system.

From time to time, it can be desirable to update or change the firmware of a computing device. Some common reasons for updating firmware include fixing bugs or adding features to the computing device.

Some methods for updating firmware involve replacing the entire firmware with a new version of the firmware. Other methods for updating firmware involve replacing or changing only a portion of the firmware. When only a portion of the firmware is replaced or changed, this can be referred to as applying a firmware update patch. The term "firmware update patch" can refer to a set of instructions that, when executed, cause a portion of the firmware of a computing device to be changed for the purpose of updating, fixing, or improving the firmware.

One or more entities can be used to manage a plurality of computing devices in a datacenter. Such entities may be referred to herein as management entities. In this context, the term "entity" can refer to a single computing device or a combination of a plurality computing devices that function together (e.g., as in a cloud computing system or another kind of distributed computing system). A management entity can be in electronic communication with the computing devices that it is responsible for managing. Communication between a management entity and the computing devices that it manages can occur via one or more computer networks.

A management entity can be used to perform various management operations with respect to the computing devices that it manages. For example, a management entity can be used to update the firmware of one or more of the computing devices that it manages.

SUMMARY

In accordance with one aspect of the present disclosure, a host computing device is disclosed that includes a host processor, host memory in electronic communication with the host processor, and an auxiliary service controller. The host computing device also includes a communication interface between the host processor and the auxiliary service controller. The host computing device also includes a messaging interface between the host processor and the auxiliary service controller. The host computing device also includes a message handler in the host memory. The message handler is executable by the host processor in response to detecting a messaging interface signal generated by the auxiliary service controller on the messaging interface. Execution of the message handler by the host processor causes a firmware update patch to be read from a shared memory region in the auxiliary service controller via the communication interface.

The auxiliary service controller may be configured to receive the firmware update patch for the host computing device from a management entity, store the firmware update patch in the shared memory region of the auxiliary service controller, and generate the messaging interface signal on the messaging interface.

The firmware update patch may be received from the management entity via an out-of-band communication path. The management entity may communicate with a management agent on the host computing device via a primary communication path. The out-of-band communication path may be independent of the primary communication path.

The communication interface may include at least one of a Peripheral Component Interconnect Express (PCI-e) communication interface, a Universal Serial Bus (USB) interface, a low pin count (LPC) bus, or an Ethernet interface.

The communication interface may include a Peripheral Component Interconnect Express (PCI-e) communication interface. The auxiliary service controller may be configured as a PCI-e endpoint device on the host computing device.

The communication interface may include a Universal Serial Bus (USB) interface. The auxiliary service controller may be configured to emulate a USB storage device.

The messaging interface may include a hardware interrupt pin on the host processor and an electrical connector that is connected to the auxiliary service controller and to the hardware interrupt pin.

The messaging interface may include an Intelligent Platform Management Interface (IPMI).

The execution of the message handler by the host processor may additionally cause the firmware update patch to be verified.

The execution of the message handler by the host processor may additionally cause the firmware update patch to be installed on the host computing device.

The host computing device may be located within a rack that includes a plurality of host computing devices, a rack manager, and a network switch that is in electronic communication with a fabric controller. The auxiliary service controller may be configured to receive the firmware update patch from a management entity. The management entity may include at least one of the rack manager or the fabric controller.

In accordance with another aspect of the present disclosure, an auxiliary service controller is disclosed that is configured to push a firmware update patch to a host computing device. The auxiliary service controller includes a processor and a communication interface between the processor and a host processor of the host computing device. The auxiliary service controller also includes a messaging interface between the processor and the host processor of the host computing device. The auxiliary service controller also includes memory in electronic communication with the processor. The memory includes a shared memory region that is accessible to the host processor via the communication interface. The auxiliary service controller also includes instructions stored in the memory. The instructions are executable by the processor to receive a firmware update patch for the host computing device from a management entity, store the firmware update patch in the shared memory region, and generate a messaging interface signal on the messaging interface that causes the host processor to read the firmware update patch from the shared memory region.

The communication interface may include at least one of a Peripheral Component Interconnect Express (PCI-e) communication interface, a Universal Serial Bus (USB) interface, a low pin count (LPC) bus, or an Ethernet interface.

The communication interface may include a Peripheral Component Interconnect Express (PCI-e) communication interface. The auxiliary service controller may be configured as a PCI-e endpoint device on the host computing device.

The communication interface may include a Universal Serial Bus (USB) interface. The auxiliary service controller may be configured to emulate a USB storage device.

The messaging interface may include an electrical connector that is connected to a hardware interrupt pin on the host processor.

The messaging interface may include an Intelligent Platform Management Interface (IPMI).

In accordance with another aspect of the present disclosure, a method is disclosed for using an auxiliary service controller to push a firmware update patch to a host computing device. The method is implemented by a management entity in a system that includes a plurality of host computing devices. The method includes obtaining the firmware update patch. The firmware update patch should be installed on the host computing device. The method also includes determining that a management agent on the host computing device is not accessible to the management entity. The method also includes sending the firmware update patch to an auxiliary service controller on the host computing device via an out-of-band communication path. The method also includes instructing the auxiliary service controller to install the firmware update patch on the host computing device.

Instructing the auxiliary service controller to install the firmware update patch on the host computing device may include sending one or more commands to the auxiliary service controller that cause the auxiliary service controller to store the firmware update patch in a shared memory region of the auxiliary service controller and generate a messaging interface signal on a messaging interface between the auxiliary service controller and a host processor.

The plurality of host computing devices may be located within a rack that includes a rack manager. The system may further include a fabric controller that is in electronic communication with the rack manager and the plurality of host computing devices in the rack. The management entity may include at least one of the rack manager or the fabric controller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to an environment in which a management entity can be used to update the firmware of one or more computing devices (e.g., computing devices in a datacenter). With current approaches, there are a variety of ways by which firmware updates can occur. For example, with some current approaches, the computing devices can each include a management agent that communicates with the management entity. The management agent on a particular device can be a software program that runs on the computing device.

When the firmware of one or more computing devices should be updated, a management entity can send the firmware update (e.g., a firmware update patch) to the management agent(s) running on the computing device(s). The management entity can instruct the management agent(s) to cause the firmware update to be installed on the computing device(s).

The primary mechanism for performing firmware updates can sometimes become unavailable. For example, in an environment in which the primary mechanism for firmware updates involves a management entity communicating with management agents, the management agents on one or more computing devices can become inaccessible such that the management entity is no longer able to communicate with them. There are many reasons why a management agent running on a computing device can become inaccessible to a management entity. For example, a management agent can become inaccessible to a management entity when the management agent hangs or freezes. As another example, a management agent can become inaccessible to a management entity when the computing device and/or the management entity loses network connectivity. When a management agent running on a computing device becomes inaccessible to the management entity, then the management entity is no longer able to use the management agent to install firmware update patches and other kinds of firmware updates on the computing device.

One aspect of the present disclosure is related to a scenario in which it is desirable to push a firmware update patch to one or more computing devices, but the primary mechanism for updating the firmware in the computing device(s) has become unavailable. For example, in an environment in which the primary mechanism for firmware updates involves a management entity communicating with management agents, the techniques disclosed herein address a scenario where one or more management agents have become inaccessible to the management entity such that the management entity cannot communicate with the management agent(s) for purposes of installing a firmware update patch.

To enable a firmware update patch to be pushed to one or more computing devices in this kind of scenario, the present disclosure proposes the use of an auxiliary service controller. An auxiliary service controller can be a specialized microcontroller within a computing device, separate from a general purpose processor. An example of an auxiliary service controller is a baseboard management controller (BMC). When there is a large group of computing devices to be managed (as in a datacenter, for example), it can be useful for auxiliary service controllers to be included in the computing devices because they allow various tasks to be performed remotely. For example, a management entity can send commands to an auxiliary service controller to take corrective actions with respect to a computing device, such as resetting or power cycling the computing device.

The present disclosure proposes the use of an auxiliary service controller to push a firmware update (e.g., a firmware update patch) to one or more computing devices when the primary mechanism for updating the firmware in the computing device(s) has become unavailable. Stated another way, the present disclosure proposes the use of an auxiliary service controller as a secondary or backup mechanism for pushing a firmware update patch to one or more computing devices.

In the discussion that follows, the term "host" may be used in connection with a computing device on which a firmware update patch should be installed. For example, a computing device on which a firmware update patch should be installed may be referred to as a host computing device. In addition, the term "host" may be used in connection with the components of a host computing device. For example, a processor on a host computing device may be referred to herein as a host processor, memory on a host computing device may be referred to herein as host memory, etc.

There are several features of an auxiliary service controller that enable it to be used for installing a firmware update patch on one or more host computing devices when the primary update mechanism becomes unavailable. For example, communication between a management entity and an auxiliary service controller is typically independent of the primary mechanism for performing firmware updates. More specifically, in an environment in which a management entity performs management operations with respect to a plurality of host computing devices and the plurality of host computing devices each include an auxiliary service controller, there can be at least two different communication paths between the management entity and the plurality of host computing devices. These communication paths may be referred to herein as a primary communication path and an out-of-band communication path (or a secondary communication path). The primary mechanism for performing firmware updates can occur via the primary communication path. For example, in implementations where a management entity performs firmware updates on a plurality of host computing devices by communicating with management agents running on the plurality of host computing devices, communication between the management entity and the management agents can occur via the primary communication path. However, communication between the management entity and the auxiliary service controllers on those host computing devices can occur via the out-of-band (or secondary) communication path.

Another feature of an auxiliary service controller that enables it to be used for pushing a firmware update patch to a host computing device is the fact that an auxiliary service controller can be configured with a shared memory region that can be accessed by the host processor. The host processor can access this shared memory region via a communication interface that exists between the auxiliary service controller and the host processor.

In some embodiments, an auxiliary service controller can be configured as a Peripheral Component Interconnect Express (PCI-e) endpoint device on a host computing device. A PCI-e endpoint device can be a memory mapped device in the address space of the host computing device. This means that the auxiliary service controller, as a PCI-e endpoint device, can be configured for performing a direct memory access (DMA) operation into the memory address space of the host computing device. As another example, an auxiliary service controller can be in communication with the host processor via a Universal Serial Bus (USB) communication interface, and the auxiliary service controller can be configured to emulate a USB storage device. With this approach, the host processor can be configured to read a file (e.g., a firmware update patch) from the memory of the auxiliary service controller in the same way that the host processor would read a file from a USB storage device. As yet another example, an auxiliary service controller can be in communication with the host processor via a low pin count (LPC) bus, and the host processor can be configured to read a file (e.g., a firmware update patch) from the memory of the auxiliary service controller via the LPC bus. As yet another example, an auxiliary service controller can be in communication with the host processor via an Ethernet interface, and the host processor can be configured to read a file (e.g., a firmware update patch) from the memory of the auxiliary service controller via the Ethernet interface. Of course, there are many other ways that an auxiliary service controller can have a shared memory region that is accessible to a host processor, and the specific examples that have been presented should not be interpreted as limiting the scope of the present disclosure.

In some embodiments, an auxiliary service controller can generate messaging interface signals that can be sent to the host processor via a messaging interface between the auxiliary service controller and the host processor and that cause the host processor to perform one or more defined operations. For example, a messaging interface signal generated by an auxiliary service controller can cause a host processor to suspend its current operations and execute a function that may be referred to herein as a message handler. As will be described in greater detail below, such messaging interface signals can be useful for pushing a firmware update patch to a host computing device.

There are many different ways that messaging interfaces and messaging interface signals can be implemented in accordance with the present disclosure. In some embodiments, a messaging interface can include one or more hardware interrupt pins on the host processor, and a messaging interface signal can be a hardware interrupt signal that is sent via the hardware interrupt pin(s). More specifically, one or more of the digital signal pins (e.g., general-purpose input/output (GPIO) pins) on the host processor can be reserved for hardware interrupt signals from the auxiliary service controller. A digital signal pin that is reserved for a hardware interrupt signal from the auxiliary service controller may be referred to herein as a hardware interrupt pin.

Another example of a messaging interface is Intelligent Platform Management Interface (IPMI). In embodiments where the messaging interface is implemented as an IPMI interface, a messaging interface signal can take the form of any signal that is sent via the IPMI interface. This type of signal may include one or more IPMI commands.

Alternatively, the techniques disclosed herein can be implemented via a custom interface between the auxiliary service controller and the host processor. In other words, the techniques disclosed herein do not necessarily require the use of a standard interface or even an existing interface, but could instead use a custom interface that facilitates communication between the auxiliary service controller and the host processor. In embodiments where the messaging interface is implemented as a custom interface, a messaging interface signal can take the form of any signal that is sent via the custom interface.

When a firmware update patch should be sent to a host computing device that includes an auxiliary service controller and the primary mechanism for sending the firmware update patch to the host computing device has become unavailable, a management entity can send the firmware update patch to the auxiliary service controller via the out-of-band communication path. In response to receiving the firmware update patch, the auxiliary service controller can save the firmware update patch in the shared memory region that is accessible to the host processor. Once the firmware update patch has been saved in the shared memory region, the auxiliary service controller can then generate a messaging interface signal on the messaging interface between the auxiliary service controller and the host processor. In response to the messaging interface signal, the host processor can execute a message handler that causes the firmware update patch to be installed on the host computing device.

Figure 1:
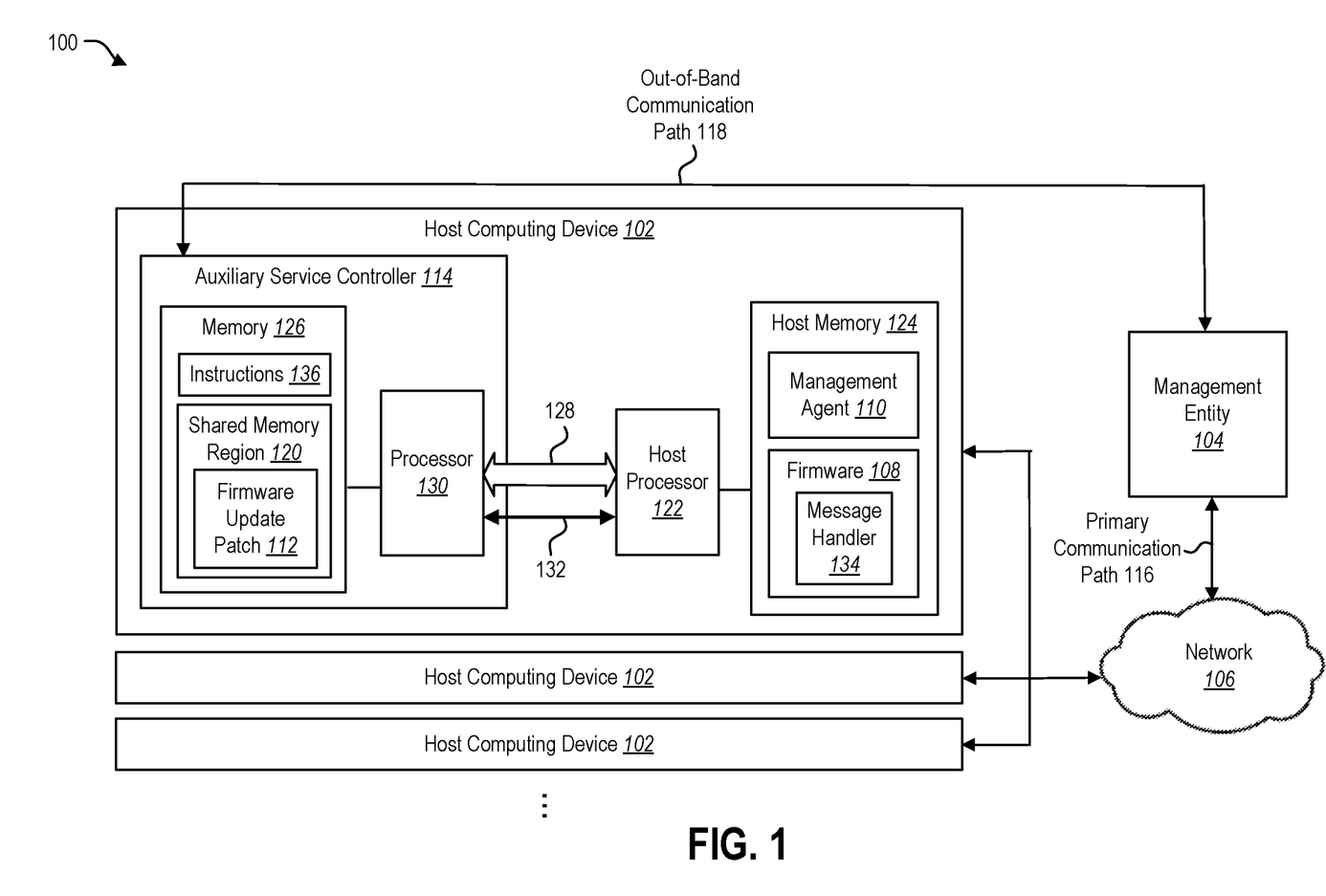
FIG. 1 illustrates an example of a system in which the techniques disclosed herein can be utilized, the system including a management entity in electronic communication with a plurality of host computing devices, and each host computing device including an auxiliary service controller.

FIG. 1 illustrates an example of a system 100 in which the techniques disclosed herein can be utilized. The system 100 can include a plurality of host computing devices 102. In some embodiments, the system 100 can include a fairly large number of host computing devices 102. For example, the system 100 can include hundreds or thousands host computing devices 102 (or more). A host computing device 102 includes at least one processor and memory in electronic communication with the processor(s). A processor on a host computing device 102 may be referred to herein as a host processor 122, and memory on a host computing device 102 may be referred to herein as host memory 124.

In some embodiments, the host computing devices 102 in the system 100 can be located within the same datacenter. Alternatively, the host computing devices 102 in the system 100 can be located within a plurality of different datacenters.

The system 100 also includes a management entity 104 in electronic communication with the plurality of host computing devices 102. Communication between the management entity 104 and the plurality of host computing devices 102 can occur via one or more computer networks 106. The management entity 104 can be used to perform various management operations with respect to the host computing devices 102. For example, the management entity 104 can be used to push a firmware update patch 112 to one or more of the host computing devices 102.

There can be many reasons why it could be desirable for a firmware update patch 112 to be installed on one or more host computing devices 102. One possible reason for installing a firmware update patch 112 on a host computing device 102 is to fix one or more problems that have been detected. Such problems can include, for example, bugs and/or security vulnerabilities found in the firmware 108. Another possible reason for installing a firmware update patch 112 on a host computing device 102 is to add additional features to the host computing device 102.

In some embodiments, one way for the management entity 104 to install a firmware update patch 112 on the host computing devices 102 involves communicating with management agents 110 that run on the host computing devices 102. For example, suppose that a firmware update patch 112 should be installed on a particular host computing device 102. To install the firmware update patch 112 on a particular host computing device 102, the management entity 104 can send the firmware update patch 112 to the management agent 110 running on the host computing device 102, and the management entity 104 can instruct the management agent 110 to cause the firmware update patch 112 to be installed on the host computing device 102. In some embodiments, this mechanism for installing a firmware update patch 112 can be considered to be the primary update mechanism. In other words, as long as the management entity 104 is able to communicate with the management agent 110 and the management agent 110 is working properly, any firmware update patches 112 can be installed through the management agent 110.

Under some circumstances, however, the management agents 110 on one or more host computing devices 102 can become inaccessible such that the management entity 104 is no longer able to communicate with them. For example, a management agent 110 can become inaccessible to the management entity 104 when the management agent 110 hangs or freezes. As another example, a management agent 110 running on a host computing device 102 can become inaccessible to the management entity 104 when the host computing device 102 and/or the management entity 104 loses its connection to the network 106. When one or more management agents 110 become unavailable to the management entity 104, there can be a need for another mechanism to remotely install a firmware update patch 112 on the corresponding host computing devices 102.

The present disclosure proposes the use of an auxiliary service controller 114 to enable a firmware update patch 112 to be installed in this kind of scenario. As indicated above, an auxiliary service controller 114 can be a specialized microcontroller within a host computing device 102, separate from the host processor 122. An auxiliary service controller 114 can include its own processor 130 and its own memory 126.

As discussed above, an auxiliary service controller 114 can include several features that enable the management entity 104 to install a firmware update patch 112 on a host computing device 102 when the management agent 110 on that host computing device 102 has become inaccessible to the management entity 104. For example, the mechanism through which the management entity 104 communicates with the auxiliary service controllers 114 in the system 100 can be independent of the mechanism through which the management entity 104 communicates with the management agents 110 in the system 100. As indicated above, the management entity 104 can communicate with the management agents 110 in the system 100 through a connection to the network 106. The communication path between the management entity 104 and the management agents 110 via the connection to the network 106 can be considered to be a primary communication path 116. By contrast, the management entity 104 can communicate with the auxiliary service controllers 114 in the system 100 through an out-of-band communication path 118. The out-of-band communication path 118 may alternatively be referred to as a secondary communication path.

The primary communication path 116 can be independent of the out-of-band communication path 118 such that outages and failures that affect the primary communication path 116 may not affect the out-of-band communication path 118 (and vice versa). Therefore, in a situation where a management agent 110 has become inaccessible to the management entity 104 because of an outage or failure related to the network 106, the management entity 104 may still be able to communicate with the auxiliary service controller 114 via the out-of-band communication path 116.

Another feature of an auxiliary service controller 114 that enables it to be used for pushing a firmware update patch 112 to a host computing device 102 is the fact that an auxiliary service controller 114 can be configured to include a shared memory region 120 that can be accessed by the host processor 122 via a communication interface 128 between the auxiliary service controller 114 and the host processor 122. The shared memory region 120 can be a portion of the memory 126 of the auxiliary service controller 114 from which the host processor 122 can read data via the communication interface 128. There are many different ways that the shared memory region 120 in the auxiliary service controller 114 can be implemented.

In some embodiments, the auxiliary service controller 114 can be configured as a PCI-e endpoint device, and the communication interface 128 can be a PCI-e communication interface. As a PCI-e endpoint device, the auxiliary service controller 114 can perform a DMA operation into the memory address space of the host computing device 102. As another example, the communication interface 128 between the processor 130 of the auxiliary service controller 114 and the host processor 122 can be a Universal Serial Bus (USB) communication interface, and the auxiliary service controller 114 can be configured to emulate a USB storage device. With this approach, the host processor 122 can read data from the shared memory region 120 of the auxiliary service controller 114 in the same way that the host processor 122 would read a file from a USB storage device. As yet another example, the communication interface 128 between the processor 130 of the auxiliary service controller 114 and the host processor 122 can be a low pin count (LPC) bus, and the host processor 122 can read data from the shared memory region 120 of the auxiliary service controller 114 via the LPC bus. As yet another example, the communication interface 128 between the processor 130 of the auxiliary service controller 114 and the host processor 122 can be an Ethernet interface.

Of course, there are many other ways that an auxiliary service controller 114 can have a shared memory region 120 that is accessible to a host processor 122, and the specific examples described above should not be interpreted as limiting the scope of the present disclosure.

Another feature of an auxiliary service controller 114 that enables it to be used for pushing a firmware update patch 112 to a host computing device 102 is the fact that an auxiliary service controller 114 can be configured to generate messaging interface signals that cause the host processor 122 to perform one or more defined operations. For example, a messaging interface signal generated by the auxiliary service controller 114 can cause the host processor 122 to execute a message handler 134. In some embodiments, the message handler 134 can be included in the firmware 108 of the host computing device 102. The message handler 134 can be configured so that, when it is executed by the host processor 122, the message handler 134 causes the host processor 122 to read a firmware update patch 112 from the shared memory region 120 of the auxiliary service controller 114 and install the firmware update patch 112 on the host computing device 102.

A messaging interface signal can be generated on a messaging interface 132 that exists between the processor 130 of the auxiliary service controller 114 and the host processor 122. As discussed above, there are many different ways that the messaging interface 132 can be implemented in accordance with the present disclosure. For example, the messaging interface 132 can be implemented using one or more digital signal pins (e.g., GPIO pins), an IPMI interface, or a custom interface.

When a firmware update patch 112 should be sent to a host computing device 102 and the primary mechanism for sending the firmware update patch 112 to the host computing device 102 has become unavailable (e.g., the management agent 110 is no longer accessible to the management entity 104), the management entity 104 can send the firmware update patch 112 to the auxiliary service controller 114 via the out-of-band communication path 118. In response to receiving the firmware update patch 112, the auxiliary service controller 114 can save the firmware update patch 112 in the shared memory region 120 that is accessible to the host processor 122. Once the firmware update patch 112 has been saved in the shared memory region 120, the auxiliary service controller 114 can then generate a messaging interface signal on the messaging interface 132 between the auxiliary service controller 114 and the host processor 122. The messaging interface signal can cause the host processor 122 to suspend its current operations and execute a message handler 134 that causes the firmware update patch 112 to be read from the shared memory region 120 and installed on the host computing device 102.

The firmware update patch 112 may include a plurality of code instructions to modify the firmware 108 of the host computing device 102. In some embodiments, the firmware update patch 112 may be a UEFI runtime patch (URP) capsule. A URP capsule can include a firmware volume, a URP capsule manifest header, a platform public key, and a patch signature. The firmware volume may include the code instructions to modify the firmware 108 and may be stored as a block of memory having a predefined size. The URP capsule manifest header may, for example, be appended at the end of the firmware volume and may include metadata such as a capsule type, a signing key length, a base BIOS version, and a URP capsule version number of the URP capsule. The patch signature may be a URP capsule signature and may be appended after the platform public key. In some embodiments, the patch signature may be assigned to the URP capsule by another entity (e.g., another server computing device). In some embodiments, the firmware volume, the URP capsule manifest header, the platform public key, and/or the patch signature may be included in the firmware update patch 112 in some other order. Additionally, other data may be further included in the firmware update patch 112.

In some embodiments, installing the firmware update patch 112 can include transferring the firmware volume of the firmware update patch 112 into non-volatile memory within a host computing device 102 and causing the code instructions in the firmware volume to be executed by the host processor 622.

FIG. 1 shows the auxiliary service controller 114 with instructions 136 in the memory 126 of the auxiliary service controller 114. These instructions 136 can be executed by the processor 130 of the auxiliary service controller 114 to implement some or all of the functionality of the auxiliary service controller 114 that is described herein.

Figure 2:
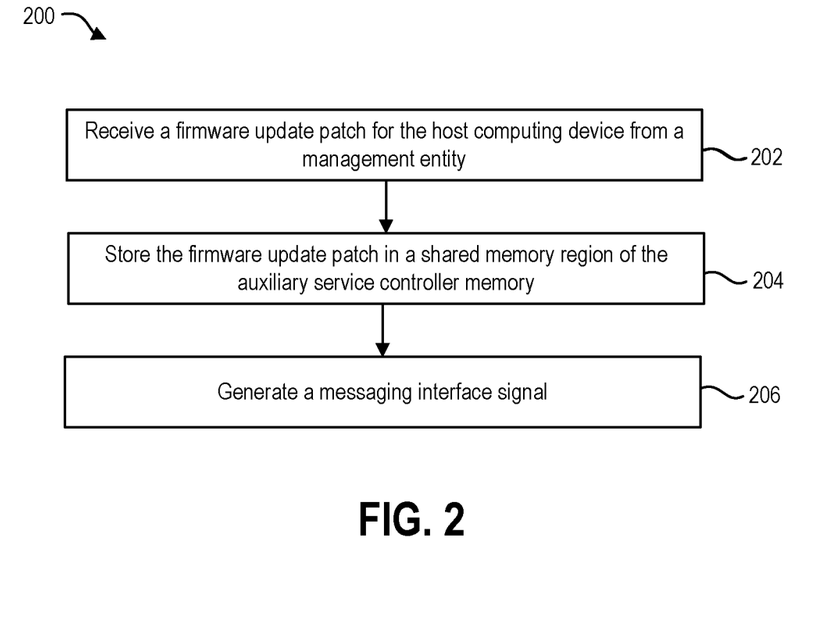
FIG. 2 illustrates an example of a method that can be implemented by an auxiliary service controller in a host computing device in accordance with the present disclosure.

FIG. 2 illustrates an example of a method 200 that can be implemented by an auxiliary service controller in a host computing device in accordance with the present disclosure. The method 200 will be described with respect to the auxiliary service controller 114 in the system 100 shown in FIG. 1.

In accordance with the method 200, the auxiliary service controller 114 can receive 202 a firmware update patch 112 for the host computing device 102 from a management entity 104. The firmware update patch 112 can be received via an out-of-band communication path 118 between the auxiliary service controller 114 and the management entity 104. As discussed above, the out-of-band communication path 118 can be independent of a primary communication path 116 that the management entity 104 uses to communicate with a management agent 110 on the host computing device 102.

In some embodiments, the firmware update patch 112 can be received from the management entity 104 when the management entity 104 determines that a primary mechanism for sending the firmware update patch 112 to the host computing device 102 is unavailable. For example, if the management entity 104 generally sends firmware update patches 112 to a management agent 110 running on the host computing device 102 but the management agent 110 has become inaccessible to the management entity 104, then the management entity 104 can send the firmware update patch 112 to the auxiliary service controller 114 via the out-of-band communication path 118. Alternatively, in some embodiments the management entity 104 can send the firmware update patch 112 to the auxiliary service controller 114 without first determining that a primary mechanism has become unavailable.

In response to receiving 202 the firmware update patch 112 from the management entity 104, the method 200 can proceed with the auxiliary service controller 114 storing 204 the firmware update patch 112 in a shared memory region 120 of the auxiliary service controller 114. As discussed above, the shared memory region 120 can be a portion of the memory 126 of the auxiliary service controller 114 from which the host processor 122 can read data via a communication interface 128 between the auxiliary service controller 114 and the host processor 122. The communication interface 128 can be a PCI-e communication interface, a USB communication interface, an LPC bus, an Ethernet interface, or the like.

Once the auxiliary service controller 114 has stored 204 the firmware update patch 112 in the shared memory region 120 of the memory 126 of the auxiliary service controller 114, the method 200 can proceed with the auxiliary service controller 114 generating 206 a messaging interface signal on a messaging interface 132 that exists between the processor 130 of the auxiliary service controller 114 and the host processor 122. Generating the messaging interface signal can cause the host processor 122 to execute a message handler 134, and execution of the message handler 134 can cause the firmware update patch 112 to be read from the shared memory region 120 and installed on the host computing device 102.

As discussed above, in some embodiments the messaging interface 132 can include a connector that is electrically connected to a hardware interrupt pin on the host processor 122. In such embodiments, generating a messaging interface signal on the messaging interface 132 can include changing the state of the hardware interrupt pin from low to high (or vice versa).

Figure 3:
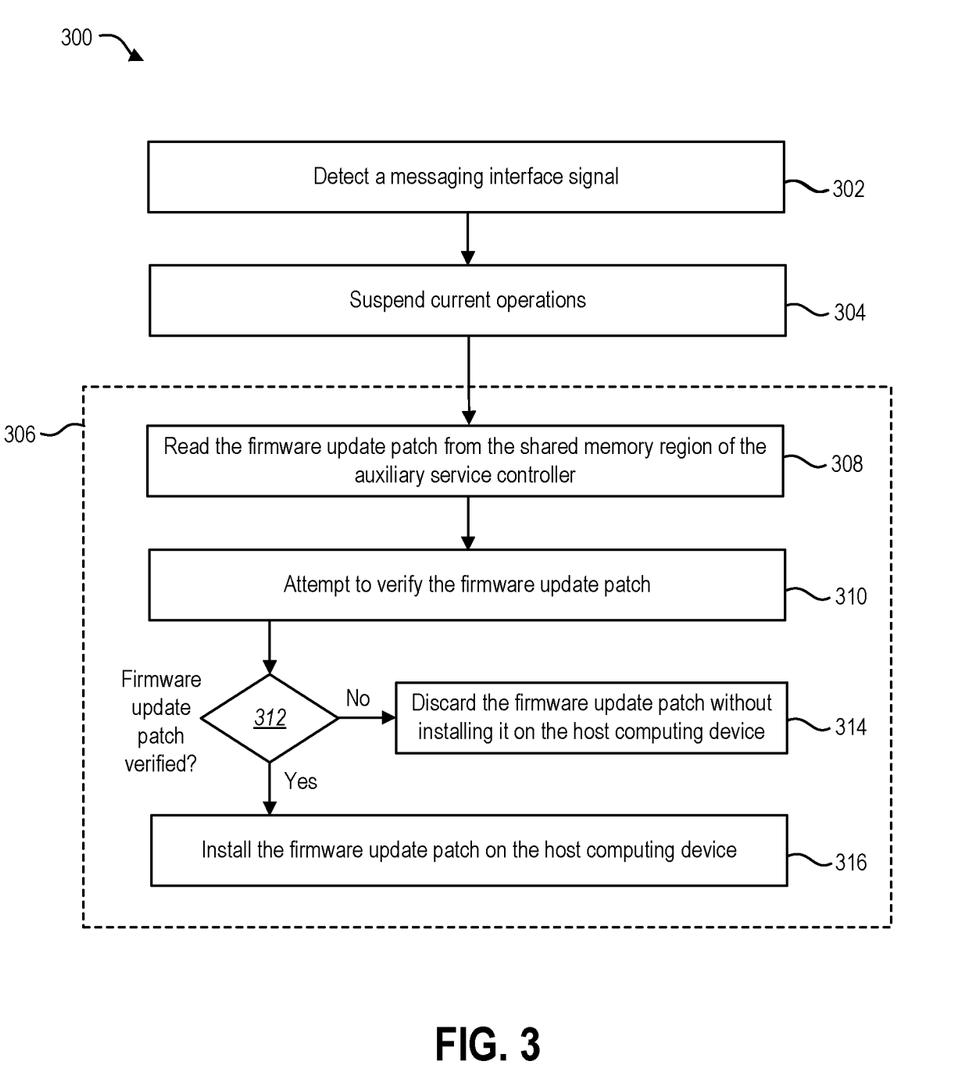
FIG. 3 illustrates an example of a method that can be implemented by a host processor of a host computing device in accordance with the present disclosure.

FIG. 3 illustrates an example of a method 300 that can be implemented by a host processor of a host computing device in accordance with the present disclosure. The method 300 will be described with respect to the host processor 122 in the system 100 shown in FIG. 1.

In accordance with the method 300, the host processor 122 can detect 302 a messaging interface signal on a messaging interface 132 that exists between the host processor 122 and the processor 130 of the auxiliary service controller 114. As discussed above, the messaging interface signal can be generated by the auxiliary service controller 114 in response to the auxiliary service controller 114 receiving a firmware update patch 112 from a management entity 104 (e.g., via an out-of-band communication path 118) and storing the firmware update patch 112 in a shared memory region 120 of the auxiliary service controller 114.

In response to detecting 302 the messaging interface signal, the host processor 122 can suspend 304 its current operations and execute 306 a message handler 134. The message handler 134 can include a set of instructions that are stored in the host memory 124 and that can be executed by the host processor 122. In some embodiments, the message handler 134 can be included in firmware 108 on the host computing device 102. The message handler 134 can be specifically associated with the messaging interface 132 such that the host processor 122 executes the message handler 134 whenever a messaging interface signal is detected on the messaging interface 132.

The execution of the message handler 134 by the host processor 122 can cause the host processor 122 to read 308 the firmware update patch 112 from the shared memory region 120 via the communication interface 128 and attempt 310 to verify the firmware update patch 112. In some embodiments, the act of attempting 310 to verify the firmware update patch 112 can include attempting to confirm that the firmware update patch 112 is from a trusted source and is authorized to be installed on the host computing device 102. If it is determined 312 that the firmware update patch 112 cannot be verified, then the host processor 122 can discard 314 the firmware update patch 112 without installing it on the host computing device 102. However, if the firmware update patch 112 is successfully verified, then the host processor 122 can install 316 the firmware update patch 112 on the host computing device 102.

As indicated above, many different types of communication interfaces 128 can be used in accordance with the present disclosure. For example, the communication interface 128 can be a PCI-e communication interface, a USB communication interface, an LPC bus, an Ethernet interface, or the like. In embodiments where the communication interface 128 is a PCI-e communication interface, the execution of the message handler 134 by the host processor 122 can cause the host processor 122 to enable the auxiliary service controller 114 to perform a DMA operation into the memory address space of the host computing device 102. In embodiments where the communication interface 128 is a USB communication interface, the execution of the message handler 134 by the host processor 122 can cause the host processor 122 to read the firmware update patch 112 from the shared memory region 120 in the same way that the host processor 122 would read a file from a USB storage device. In embodiments where the communication interface 128 is an LPC bus, the execution of the message handler 134 by the host processor 122 can cause the host processor 122 to read the firmware update patch 112 from the shared memory region 120 via the LPC bus. In embodiments where the communication interface 128 is an Ethernet interface, the execution of the message handler 134 by the host processor 122 can cause the host processor 122 to read the firmware update patch 112 from the shared memory region 120 via the Ethernet interface.

Figure 4:
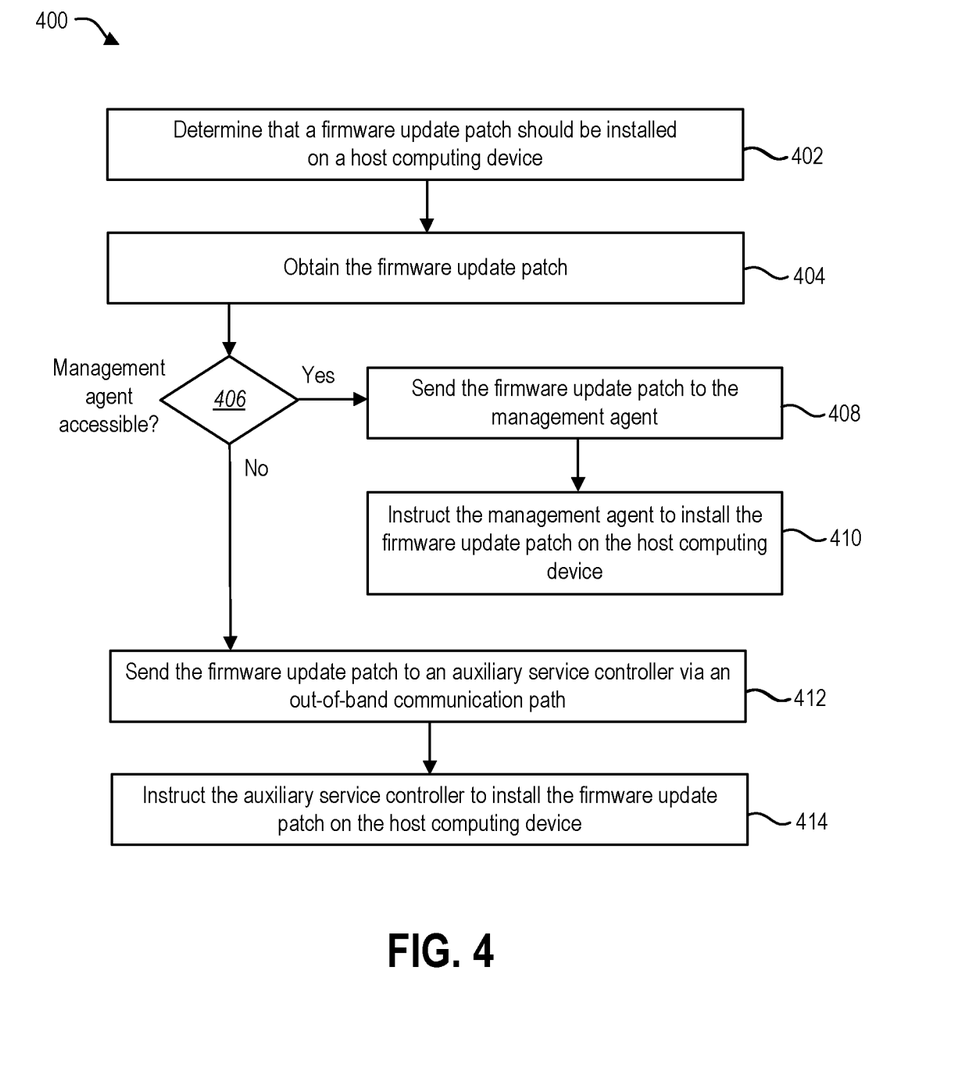
FIG. 4 illustrates an example of a method that can be implemented by a management entity in accordance with the present disclosure.

FIG. 4 illustrates an example of a method 400 that can be implemented by a management entity in accordance with the present disclosure. The method 400 will be described with respect to the management entity 104 in the system 100 shown in FIG. 1.

In accordance with the method 400, the management entity 104 can determine 402 that a firmware update patch 112 should be installed on a host computing device 102. In some embodiments, the act of determining 402 that a firmware update patch 112 should be installed on a host computing device 102 can include receiving user input directing the management entity 104 to install the firmware update patch 112 on the host computing device 102. As another example, the act of determining 402 that a firmware update patch 112 should be installed on a host computing device 102 can include determining that one or more pre-defined criteria have been satisfied. This determination can be made either with or without user input. In some embodiments, a management entity 104 can automatically determine that one or more pre-defined criteria have been satisfied and then perform the remaining acts in the method 400 in response to that determination.

The method 400 can also include obtaining 404 the firmware update patch 112 that should be installed on the host computing device 102. In some embodiments, the act of obtaining 404 the firmware update patch 112 that should be installed on the host computing device 102 can include receiving user input that includes the firmware update patch 112 to be installed. As another example, the act of obtaining 404 the firmware update patch 112 that should be installed on the host computing device 102 can include receiving user input directing the management entity 104 to download the firmware update patch 112 from another location (e.g., another server that is in electronic communication with the management entity 104).

In general terms, the remainder of the method 400 can include the management entity 104 determining whether a primary mechanism for installing the firmware update patch 112 is available. If the primary mechanism for installing the firmware update patch 112 is available, then the management entity 104 can use this primary mechanism to install the firmware update patch 112 on the host computing device 102. However, if the primary mechanism for installing the firmware update patch 112 is not available, then the management entity 104 can use a secondary mechanism to install the firmware update patch 112 on the host computing device 102. This secondary mechanism can include sending the firmware update patch 112 to an auxiliary service controller 114 via an out-of-band communication path 118.

More specifically, in accordance with the method 400 the management entity 104 can determine 406 whether a management agent 110 on a host computing device 102 is accessible to the management entity 104. In some embodiments, the act of determining 406 whether a management agent 110 is accessible to the management entity 104 can include attempting to communicate with the management agent 110. For example, the management entity 104 can send a message to the management agent 110 and wait for a pre-determined time duration for a response from the management agent 110. If the management agent 110 responds to the message within the pre-determined time duration, then the management entity 104 can conclude that the management agent 110 is accessible. However, if the management agent 110 does not respond to the message within the pre-determined time duration, then the management entity 104 can conclude that the management agent 110 is not accessible.

If the management entity 104 determines 406 that the management agent 110 is accessible to the management entity 104, the management entity 104 can send 408 the firmware update patch 112 to the management agent 110. In some embodiments, the management entity 104 can send 408 the firmware update patch 112 to the management agent 110 via a primary communication path 116. As discussed above, communication between the management entity 104 and a management agent 110 on a host computing device 102 can occur via one or more computer networks 106, and this communication path can be considered to be a primary communication path 116. The management entity 104 can also instruct 410 the management agent 110 to install the firmware update patch 112 on the host computing device 102.

However, if the management agent 110 is not accessible to the management entity 104, the management entity 104 can send 412 the firmware update patch 112 to an auxiliary service controller 114 on the host computing device 102. In some embodiments, the firmware update patch 112 can be sent to the auxiliary service controller 114 via an out-of-band communication path 118 between the management entity 104 and the auxiliary service controller 114. As discussed above, the out-of-band communication path 118 can be independent of the primary communication path 116 that the management entity 104 uses to communicate with the management agent 110 (when the management agent 110 is accessible to the management entity 104).

The management entity 104 can also instruct 414 the auxiliary service controller 114 to install the firmware update patch 112 on the host computing device 102. In some embodiments, the act of instructing 414 the auxiliary service controller 114 to install the firmware update patch 112 on the host computing device 102 can include sending one or more commands to the auxiliary service controller 114. The management entity 104 can send the command(s) to the auxiliary service controller 114 via the out-of-band communication path 118. The command(s) can cause the auxiliary service controller 114 to store the firmware update patch 112 in a shared memory region 120 of the auxiliary service controller 114 and generate a messaging interface signal on a messaging interface 132 between the auxiliary service controller 114 and the host processor 122, as described above.

Figure 5:
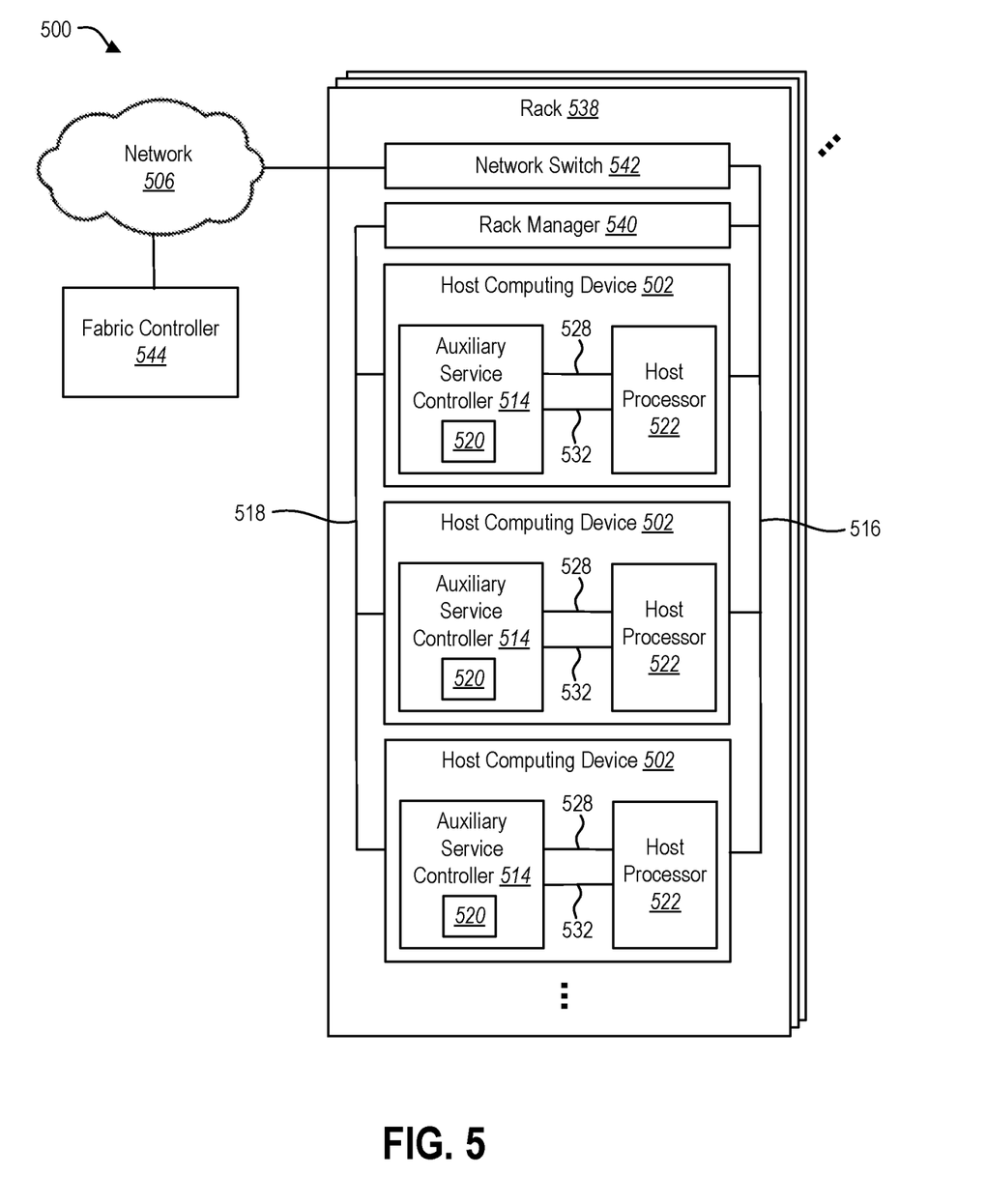
FIG. 5 illustrates another example of a system in which the techniques disclosed herein can be utilized, the system including a plurality of racks, each rack including a rack manager and a plurality of host computing devices, and each rack of host computing devices being in electronic communication with a fabric controller.

FIG. 5 illustrates another example of a system 500 in which the techniques disclosed herein can be utilized. The system 500 shown in FIG. 5 is an example of one possible implementation of the system 100 shown in FIG. 1.

The system 500 shown in FIG. 5 includes a plurality of host computing devices 502. The host computing devices 502 can be configured similarly to the host computing devices 102 shown in FIG. 1. For example, the host computing devices 502 can each include an auxiliary service controller 514 that can be used to push a firmware update patch to the host computing device 502. The auxiliary service controllers 514 can be configured to operate similarly to the auxiliary service controller 114 in the system 100 shown in FIG. 1. In particular, each auxiliary service controller 514 can be configured so that when it receives a firmware update patch, the auxiliary service controller 514 saves the firmware update patch in a shared memory region 520 of the auxiliary service controller 514 and generates a messaging interface signal on a messaging interface 532 between the auxiliary service controller 514 and the host processor 522. In response to this messaging interface signal, the host processor 522 can execute a message handler that causes the firmware update patch to be read from the shared memory region 520 via a communication interface 528 between the auxiliary service controller 514 and the host processor 522. The execution of the message handler can also cause the host processor 522 to verify that the firmware update patch is from an authorized source and, once the firmware update patch has been appropriately verified, install the firmware update patch on the host computing device 502.

The system 500 shown in FIG. 5 includes a plurality of racks 538. Each rack 538 includes a plurality of host computing devices 502. Each rack 538 also includes a rack manager 540. The rack manager 540 within a particular rack 538 can be configured to perform management operations with respect to host computing devices 502 within the rack 538.

The rack manager 540 and the host computing devices 502 within a particular rack 538 can be in electronic communication with a network switch 542, which facilitates a connection to a network 506. A fabric controller 544 can be in electronic communication with the rack managers 540 and the host computing devices 502 in the various racks 538 via the network 506. The fabric controller 544 can also be configured to perform management operations with respect to the host computing devices 502 in the system 500.

The rack manager 540 and the fabric controller 544 are both examples of the management entity 104 in the system 100 shown in FIG. 1. In some embodiments, the rack manager 540 can be configured to perform the operations of the management entity 104 that were described above. In other embodiments, the fabric controller 544 can be configured to perform the operations of the management entity 104 that were described above. Alternatively, the rack manager 540 and the fabric controller 544 can collectively perform the operations of the management entity 104. For example, the rack manager 540 can perform some of the operations of the management entity 104, and the fabric controller 544 can perform other operations of the management entity 104.

The rack manager 540 in a particular rack 538 can communicate with the host computing devices 502 in the rack 538 via two distinct communication paths. One of the communication paths can occur via the network 506. In particular, the rack manager 540 in a particular rack 538 and the host computing devices 502 in that same rack 538 can all be in electronic communication with the network switch 542 within the rack 538. The network switch 542 can facilitate a connection to the network 506. Thus, the rack manager 540 is able to communicate with the host computing devices 502 via a connection to the network 506. This connection to the network 506 can be considered to be a primary communication path 516 between the rack manager 540 and the host computing devices 502. This primary communication path 516 is one example of the primary communication path 116 in the system 100 of FIG. 1.

In addition, there can also be another communication path between the rack manager 540 and the host computing devices 502. This alternate communication path can be considered to be an out-of-band (or secondary) communication path 518 between the rack manager 540 and the host computing devices 502. This out-of-band communication path 518 is one example of the out-of-band communication path 118 in the system 100 of FIG. 1.

The system 500 shown in FIG. 5 can represent one or more datacenters. In some embodiments, the various racks 538 (and host computing devices 502 contained therein) can be located within a single datacenter. In other embodiments, the racks 538 can be located within a plurality of different datacenters.

Figure 6:
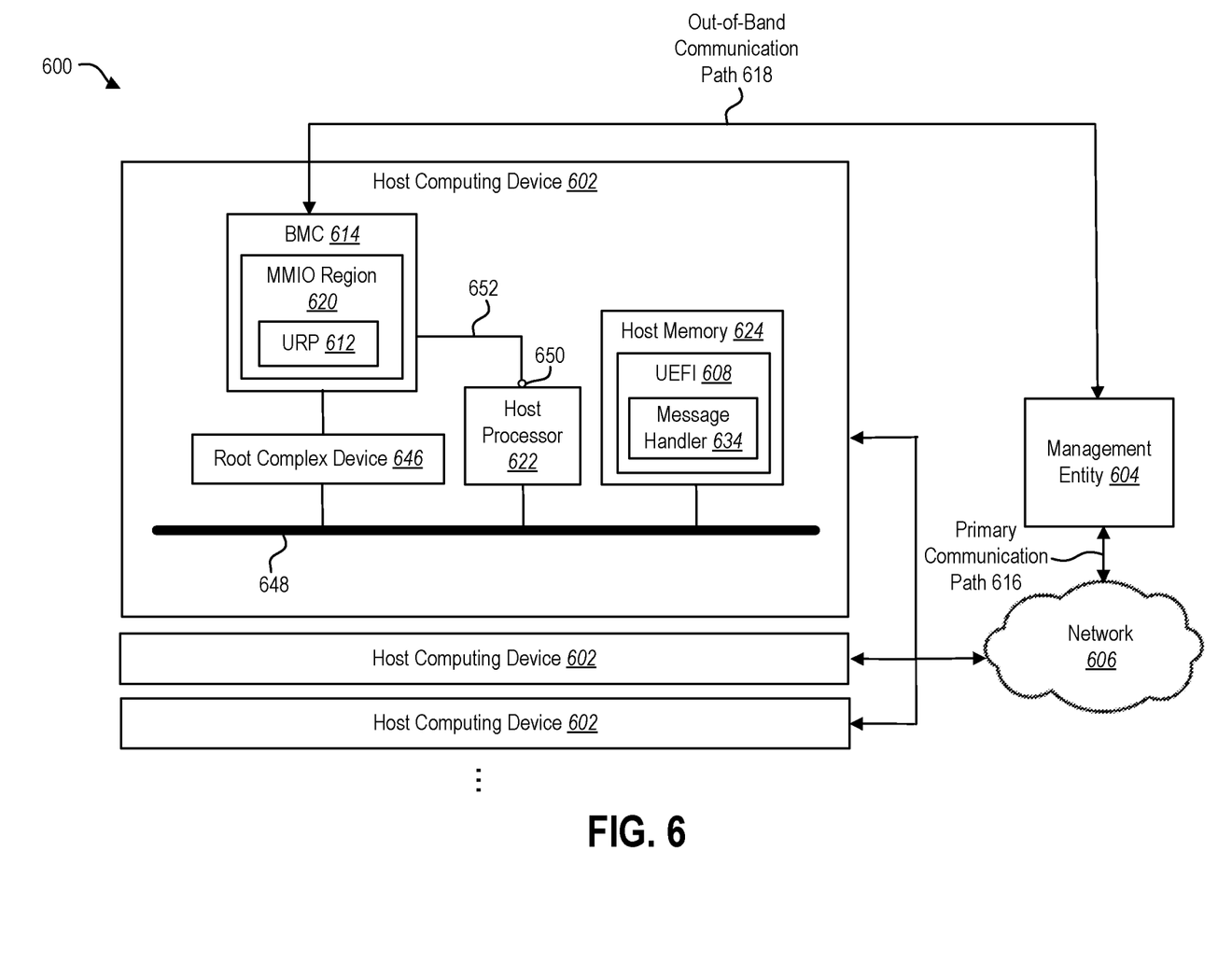
FIG. 6 illustrates another example of a system in which the techniques disclosed herein can be utilized, the system including a management entity in electronic communication with a plurality of host computing devices, and each host computing device including a baseboard management controller.

FIG. 6 illustrates another example of a system 600 in which the techniques disclosed herein can be utilized. The system 600 shown in FIG. 6 is another example of a possible implementation of the system 100 shown in FIG. 1.

The system 600 shown in FIG. 6 includes a plurality of host computing devices 602 that are in electronic communication with a management entity 604 via one or more networks 606. Each host computing device 602 can include a baseboard management controller (BMC) 614. The BMC 614 is an example of the auxiliary service controller 114 in the system 100 shown in FIG. 1.

In the depicted embodiment, the BMC 614 is in electronic communication with the host processor 622 via a PCI-e communication interface. More specifically, the BMC 614 can be configured as a PCI-e device on a root complex device 646. The root complex device 646 connects the host processor 622 and host memory 624 of the host computing device 602 to the PCI-e switch fabric 648.

As discussed above, there are many different types of communication interfaces that can be used to facilitate communication between an auxiliary service controller (such as the BMC 614 in the system 600 shown in FIG. 6) and a host processor 622. The fact that the BMC 614 is depicted as a PCI-e device in the example shown in FIG. 6 should not be interpreted as limiting the scope of the present disclosure. Some other examples of communication interfaces that could be used include a USB interface, an LPC bus, and an Ethernet interface, as discussed above.

The host memory 624 includes firmware, which in the depicted embodiment is a UEFI 608. As before, a management entity 604 in the system 600 can be configured to cause a firmware update patch to be installed on the host computing device 602. In the depicted embodiment, the firmware update patch can take the form of a UEFI runtime payload (URP) 612.

As a host computing device 602 is booted, the UEFI 608 allocates a memory-mapped input/output (MMIO) region 620 for the BMC 614 as a PCI-e endpoint. The MMIO region 620 is an example of the shared memory region 120 in the system 100 shown in FIG. 1. To install a URP 612 on a host computing device 602, a management entity 604 can send the URP 612 to the BMC 614 via an out-of-band communication path 618. The out-of-band communication path 618 can be independent of a primary communication path 616 that the management entity 604 uses to communicate with the host computing devices 602. In response to receiving the URP 612, the BMC 614 can save the URP 612 in the MMIO region 620, which is accessible to the host processor 622. In some embodiments, the BMC 614 can perform a DMA operation into the memory address space of the host computing device 602. The BMC 614 can then generate a messaging interface signal on a messaging interface between the BMC 614 and the host processor 622. The messaging interface signal can cause the host processor 622 to suspend its current operations and execute a message handler 634 that causes the URP 612 to be read from the MMIO region 620 and installed on the host computing device 602.

In the depicted embodiment, the messaging interface can include a hardware interrupt pin 650 on the host processor 622 and an electrical connector 652 that is connected to the BMC 614 and to the hardware interrupt pin 650. In such embodiments, generating a messaging interface signal on the messaging interface can include generating a signal on the electrical connector 652 that causes the state of the hardware interrupt pin 650 to be changed from low to high (or vice versa).

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A host computing device, comprising:
a host processor;
host memory in electronic communication with the host processor;
an auxiliary service controller;
a communication interface between the host processor and the auxiliary service controller;
a messaging interface between the host processor and the auxiliary service controller; and
a message handler in the host memory, wherein the message handler is executable by the host processor in response to detecting a messaging interface signal generated by the auxiliary service controller on the messaging interface, and wherein execution of the message handler by the host processor causes the host processor to read a firmware update patch from a shared memory region in the auxiliary service controller via the communication interface and install the firmware update patch on the host computing device.

2. The host computing device of claim 1, wherein the auxiliary service controller to:
receives the firmware update patch for the host computing device from a management entity;
stores the firmware update patch in the shared memory region of the auxiliary service controller; and
generates the messaging interface signal on the messaging interface.

3. The host computing device of claim 2, wherein:
the firmware update patch is received from the management entity via an out-of-band communication path;
the management entity communicates with a management agent on the host computing device via a primary communication path; and
the out-of-band communication path is independent of the primary communication path.

4. The host computing device of claim 1, wherein the communication interface comprises at least one of a Peripheral Component Interconnect Express (PCI-e) communication interface, a Universal Serial Bus (USB) interface, a low pin count (LPC) bus, or an Ethernet interface.

5. The host computing device of claim 1, wherein:
the communication interface comprises a Peripheral Component Interconnect Express (PCI-e) communication interface; and
the auxiliary service controller is configured as a PCI-e endpoint device on the host computing device.

6. The host computing device of claim 1, wherein:
the communication interface comprises a Universal Serial Bus (USB) interface; and
the auxiliary service controller is configured to emulate a USB storage device.

7. The host computing device of claim 1, wherein the messaging interface comprises:
a hardware interrupt pin on the host processor; and
an electrical connector that is connected to the auxiliary service controller and to the hardware interrupt pin.

8. The host computing device of claim 1, wherein the messaging interface comprises an Intelligent Platform Management Interface (IPMI).

9. The host computing device of claim 1, wherein the execution of the message handler by the host processor additionally causes the host processor to verify the firmware update patch.

10. The host computing device of claim 1, wherein:
the host computing device is located within a rack that comprises a plurality of host computing devices, a rack manager, and a network switch that is in electronic communication with a fabric controller;
the auxiliary service controller receives the firmware update patch from a management entity; and
the management entity comprises at least one of the rack manager or the fabric controller.

11. An auxiliary service controller that pushes a firmware update patch to a host computing device, comprising:
a processor;
a communication interface between the processor and a host processor of the host computing device;
a messaging interface between the processor and the host processor of the host computing device, wherein the communication interface is separate from the messaging interface;
memory in electronic communication with the processor, the memory comprising a shared memory region that is accessible to the host processor via the communication interface; and
instructions stored in the memory, the instructions being executable by the processor to:
receive a firmware update patch for the host computing device from a management entity;
store the firmware update patch in the shared memory region; and
generate a messaging interface signal on the messaging interface that causes the host processor to read the firmware update patch from the shared memory region and install the firmware update patch.

12. The auxiliary service controller of claim 11, wherein the communication interface comprises at least one of a Peripheral Component Interconnect Express (PCI-e) communication interface, a Universal Serial Bus (USB) interface, a low pin count (LPC) bus, or an Ethernet interface.

13. The auxiliary service controller of claim 11, wherein:
the communication interface comprises a Universal Serial Bus (USB) interface; and
the auxiliary service controller emulates a USB storage device.

14. The auxiliary service controller of claim 11, wherein the messaging interface comprises an electrical connector that is connected to a hardware interrupt pin on the host processor.

15. The auxiliary service controller of claim 11, wherein the messaging interface comprises an Intelligent Platform Management Interface (IPMI).

16. A method for using an auxiliary service controller to push a firmware update patch to a host computing device, the method being implemented by a management entity in a system that comprises a plurality of host computing devices, the method comprising:
obtaining the firmware update patch, wherein the firmware update patch should be installed on the host computing device;
determining that a management agent on the host computing device is not accessible to the management entity;
sending, by the management entity, the firmware update patch to an auxiliary service controller on the host computing device via an out-of-band communication path; and
instructing the auxiliary service controller to:
store the firmware update patch in a shared memory region of the auxiliary service controller;
generate a messaging interface signal on a messaging interface between the auxiliary service controller and a host processor; and
cause a host processor on the host computing device to install the firmware update patch accessed from the shared memory region of the auxiliary service controller on the host computing device.

17. The method of claim 16, wherein:
the plurality of host computing devices are located within a rack that comprises a rack manager;
the system further comprises a fabric controller that is in electronic communication with the rack manager and the plurality of host computing devices in the rack; and
the management entity comprises at least one of the rack manager or the fabric controller.

* * * * *